J. F. ELLIS.
LAYING CABINET.
APPLICATION FILED AUG. 15, 1919.
1,342,434.
Patented June 8, 1920.
2 SHEETS—SHEET 1.
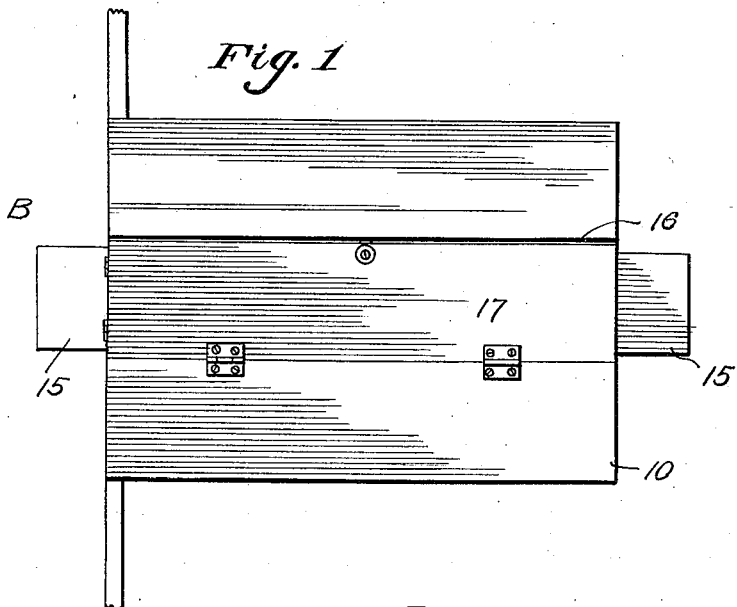
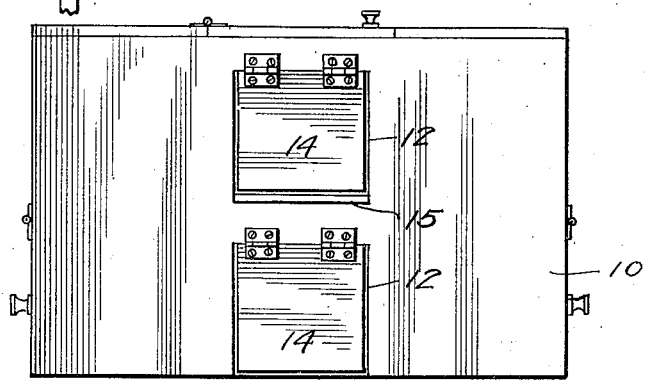
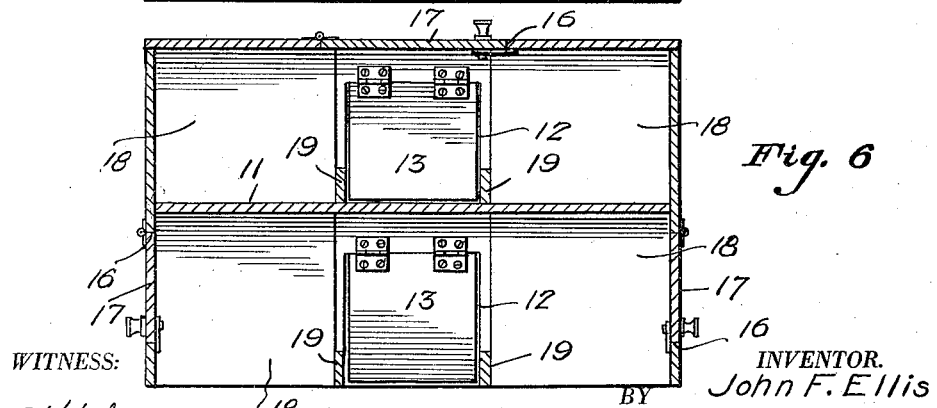
WITNESS:
INVENTOR.
John F. Ellis
BY
Victor J. Evans
ATTORNEY.

J. F. ELLIS.
LAYING CABINET.
APPLICATION FILED AUG. 15, 1919.
1,342,434.
Patented June 8, 1920.
2 SHEETS—SHEET 2.
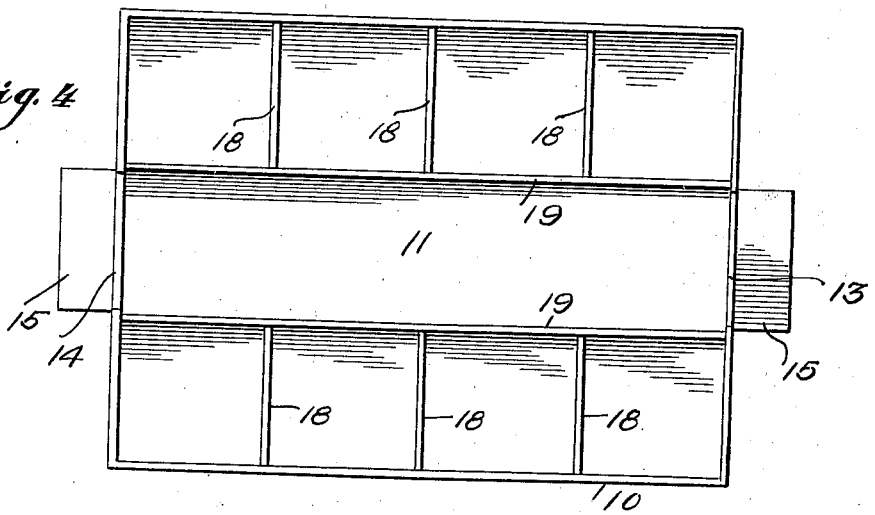
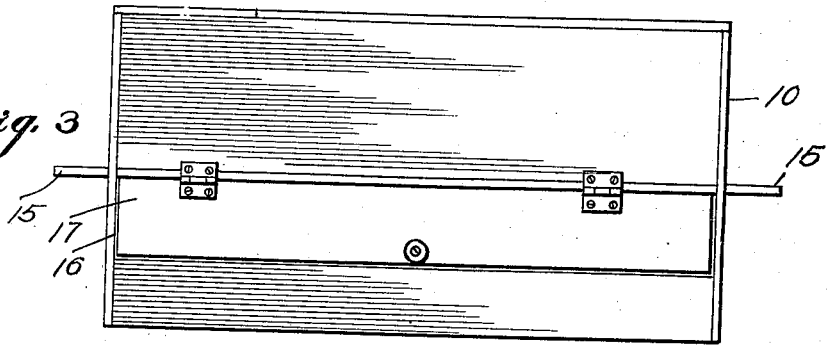
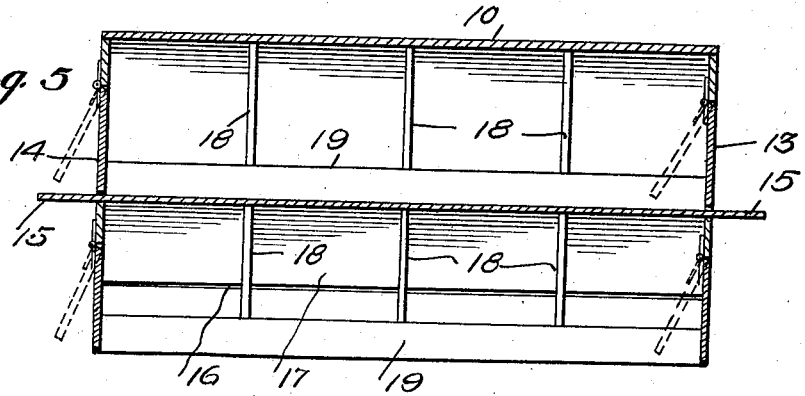
WITNESS:
INVENTOR.
BY John F. Ellis
Victor J. Evans
ATTORNEY.

UNITED STATES PATENT OFFICE.

JOHN FRANKLIN ELLIS, OF HUNTINGTON, WEST VIRGINIA.

LAYING-CABINET.

1,342,434. Specification of Letters Patent. Patented June 8, 1920.

Application filed August 15, 1919. Serial No. 317,735.

*To all whom it may concern:*

Be it known that I, JOHN F. ELLIS, a citizen of the United States, residing at Huntington, in the county of Cabell and State of West Virginia, have invented new and useful Improvements in Laying-Cabinets, of which the following is a specification.

This invention relates to devices used in the raising of poultry and has for its object the provision of a cabinet provided at each end with trap doors and containing a plurality of nests within which the hens may lay, the device being adapted to serve as the means of communication between the hen yard and a yard within which is kept a rooster, the idea being that the hens entering the device and after laying, will pass out at the other end thereof into the male pen where they may receive attention so that proper fertilization of the eggs will be insured.

It is well known among chicken raisers that a rooster surrounded by a large flock of hens will not devote sufficient of his time to eating. It is also well known that most hens lay before noon and it is therefore apparent that in the use of my device the hens may be turned out of the male pen shortly after noon, thereby giving the rooster the greater part of his time to eat and keep strong.

Another object is the provision of a cabinet of this character which is so constructed that it may be used as a trap nest as it is provided at its ends with trap doors, which, on account of being somewhat dark, will prevent the eating of eggs by loafing hens, and which will consequently be an efficient device and an improvement in the art.

With the above and other objects and advantages in view, the invention consists in the details of construction to be hereinafter more fully described and claimed, and illustrated in the accompanying drawings in which—

Figure 1 is a plan view of the device showing it as the means of communication between a hen yard and a rooster yard and illustrating the working out of the system, Fig. 2 is an end elevation of the device, Fig. 3 is a side elevation, Fig. 4 is a plan view with the roof omitted, Fig. 5 is a longitudinal sectional view, and Fig. 6 is a cross sectional view.

Referring more particularly to the drawings, I have shown my device as comprising a rectangular casing or box 10 of suitable dimensions which is preferably divided centrally into two compartments by a platform or partition 11. At each end the box is provided with two doorways 12, those at one end being closed by inwardly swinging trap doors 13 and those at the other end being closed by outwardly swinging trap doors 14. Beneath the uppermost doorways 12 are preferably disposed platforms 15 upon which the hens may walk to facilitate their entrance to and exit from the device. Upon each side of the box 10 I provide openings 16 which communicate with the lower compartments separately and which are closed by doors 17 which are suitably hinged and which are provided with suitable fastening means, and the purpose of which is to permit access of the operator to the interior of the device.

Disposed within the two compartments below and above the partition 11 are short partitions 18 which are connected by longitudinal bars 19 and which provide a plurality of nests. It will be observed that the openings 16 in the sides of the box allow the operator to remove the eggs from the nests.

In the use of the device it will be seen that in the carrying out of my system the box is placed at a hole in the wall which separates a hen yard A from a male pen B. It will be apparent that when the hens desire to lay they will enter the device through the doorway 12 at one end thereof, will lay within any one of the nests and will subsequently pass out through the outwardly opening trap doors 14. The hens thus leaving the device will enter the male pen. As most of the hens lay before noon they may all be turned out of the male pen at an early hour so as to permit the rooster to be undisturbed for the remainder of the day so that he may feed properly and keep in fit condition.

From the foregoing description and a study of the drawings it will be apparent that I have thus provided a very simply constructed cabinet which will economize in space as it will take care of the laying of a great many hens, which will serve the purpose of a trap nest, which will be lice-proof and otherwise sanitary when made of metal, and which will be a distinct improvement in the art.

While I have shown and described the preferred embodiment of my invention it is of course to be understood that I reserve the right to make such changes in the form, construction, and arrangement of parts as will not depart from the spirit of the invention or the scope of the subjoined claims.

Having thus described my invention, I claim:—

1. A device of the character described comprising a rectangular casing, a horizontally disposed partition arranged centrally of said casing and dividing the interior thereof into similar upper and lower compartments, each end of the casing being provided with doorways communicating with the respective compartments, inwardly opening trap doors closing the openings at one end of the casing, outwardly opening trap doors closing the openings at the other end of the casing, the sides of the casing being provided with openings communicating with the lower compartments, hinged doors normally closing said last named openings and permitting access of an operator to said lower compartments, a plurality of short partitions disposed within each compartment, bars extending longitudinally of the casing and connecting the upper portions of said short partitions and defining therewith a plurality of separate nests.

2. A device of the character described comprising a rectangular casing, a horizontal partition arranged within said casing and dividing the interior thereof into upper and lower compartments, each end of the casing being provided with doorways communicating with the respective compartments, inwardly opening trap doors closing the doorways at one end of the casing, outwardly opening trap doors closing the doorways at the other end of the casing, and a plurality of partitions disposed within each compartment at the sides thereof and defining a plurality of separate nests.

In testimony whereof I affix my signature.

JOHN FRANKLIN ELLIS.